US007636233B2

(12) United States Patent
Callsen et al.

(10) Patent No.: US 7,636,233 B2
(45) Date of Patent: Dec. 22, 2009

(54) MULTI-COMPARTMENTAL TRANSFORMER AND METHODS OF MAINTENANCE THEREFOR

(75) Inventors: Thomas P. Callsen, Elgin, IL (US); Martin A. Rave, Chicago, IL (US)

(73) Assignee: Commonwealth Edison Co., Chicago IL ( * ) Notice: Subject to any disclaimer, the term of this patent is extended or adjusted under 35 U.S.C. 154(b) by 257 days.

(21) Appl. No.: 11/238,799

(22) Filed: Sep. 29, 2005

(65) Prior Publication Data
US 2007/0070583 A1 Mar. 29, 2007

Related U.S. Application Data

(60) Provisional application No. 60/707,593, filed on Aug. 12, 2005.

(51) Int. Cl.
H02B 5/00 (2006.01)
H02B 7/00 (2006.01)
A47B 81/00 (2006.01)
H05K 5/00 (2006.01)

(52) U.S. Cl. .................. 361/623; 361/603; 361/620; 312/223.6; 174/520

(58) Field of Classification Search .......... 361/603, 361/620, 623; 174/520; 312/223.6; 200/48
See application file for complete search history.

(56) References Cited

U.S. PATENT DOCUMENTS

| 1,816,034 | A | * | 7/1931 | Wood | 361/622 |
|---|---|---|---|---|---|
| 2,274,106 | A | * | 2/1942 | Strong et al. | 312/100 |
| 2,756,368 | A | * | 7/1956 | Gross et al. | 361/601 |
| 2,952,799 | A | * | 9/1960 | Wortman et al. | 361/605 |
| 3,014,158 | A | * | 12/1961 | Nelson et al. | 361/41 |
| 3,210,456 | A | * | 10/1965 | Skubal | 174/16.1 |
| 3,210,750 | A | * | 10/1965 | Leonard | 340/650 |
| 3,335,380 | A | * | 8/1967 | Gramlich et al. | 336/90 |
| 3,340,441 | A | * | 9/1967 | Probert | 361/616 |
| 3,621,339 | A | * | 11/1971 | Hodgson | 361/678 |
| 3,870,932 | A | * | 3/1975 | Broverman | 361/268 |
| 4,090,230 | A | * | 5/1978 | Fuller et al. | 361/617 |

(Continued)

OTHER PUBLICATIONS

Cooper/Cooper Power Systems; Two Position Sidewall (Horizontal) Mounted Loadbreak Switches; Electrical Apparatus 800-65; OEM Equipment; Oct. 2002 (Supersedes Apr. 1997).

(Continued)

Primary Examiner—Jayprakash N Gandhi
Assistant Examiner—Bradley H Thomas
(74) Attorney, Agent, or Firm—RatnerPrestia

(57) ABSTRACT

A compartmental transformer and a method maintenance therefore is provided. The transformer includes a first compartment housing first equipment electrically coupled to the high voltage side of the transformer and a second compartment housing second equipment electrically coupled with the low voltage side of the transformer. The transformer further includes a maintenance compartment, separate from the first and second compartments, for housing a plurality of maintenance devices used for servicing the transformer while the transformer is energized. The method includes co-locating and securing preventative maintenance devices in one secured compartment remote from a voltage at or above a level corresponding to the lower of the voltages of the primary or secondary sides of the transformer, maintaining the transformer in an energized state, opening the secured compartment, and performing preventative maintenance tasks on respective preventative maintenance devices while the transformer is maintained in the energized state.

25 Claims, 6 Drawing Sheets

U.S. PATENT DOCUMENTS

| | | | | |
|---|---|---|---|---|
| 5,078,437 | A * | 1/1992 | Borgmeyer et al. | 292/206 |
| 5,189,257 | A * | 2/1993 | Borgmeyer et al. | 174/50 |
| 5,574,378 | A * | 11/1996 | Meyer et al. | 324/541 |
| 5,715,134 | A * | 2/1998 | Maineult et al. | 361/604 |
| 5,889,231 | A * | 3/1999 | Marusinec et al. | 174/50 |
| 6,066,802 | A * | 5/2000 | Reinke et al. | 174/50 |
| 6,233,137 | B1 * | 5/2001 | Kolos et al. | 361/603 |
| 6,467,640 | B1 * | 10/2002 | Hung | 220/4.02 |
| 6,667,438 | B2 * | 12/2003 | Schneider et al. | 174/50 |
| 6,770,810 | B2 * | 8/2004 | Wiebe et al. | 174/50 |
| 7,142,410 | B2 * | 11/2006 | Norris et al. | 361/603 |
| 2003/0102141 | A1 * | 6/2003 | Schneider et al. | 174/50 |
| 2003/0206391 | A1 * | 11/2003 | Princinsky et al. | 361/600 |
| 2006/0181837 | A1 * | 8/2006 | Sun et al. | 361/602 |

OTHER PUBLICATIONS

Cooper/Cooper Power System; Two Position Sidewall (Horizontal) Mounted Loadbreak Switches Installation Instructions; OEM Equipment; Service Information S800-65-1; Oct. 1997.

Qualitrol Corporation; 5" Bimetal Alarm Thermometers 165/167 Series/ Bulletin Q-165; Date Unknown.

Qualitrol Corporation; Liquid Level Control Gages; Bulletin QT2-220; Date Unknown.

* cited by examiner

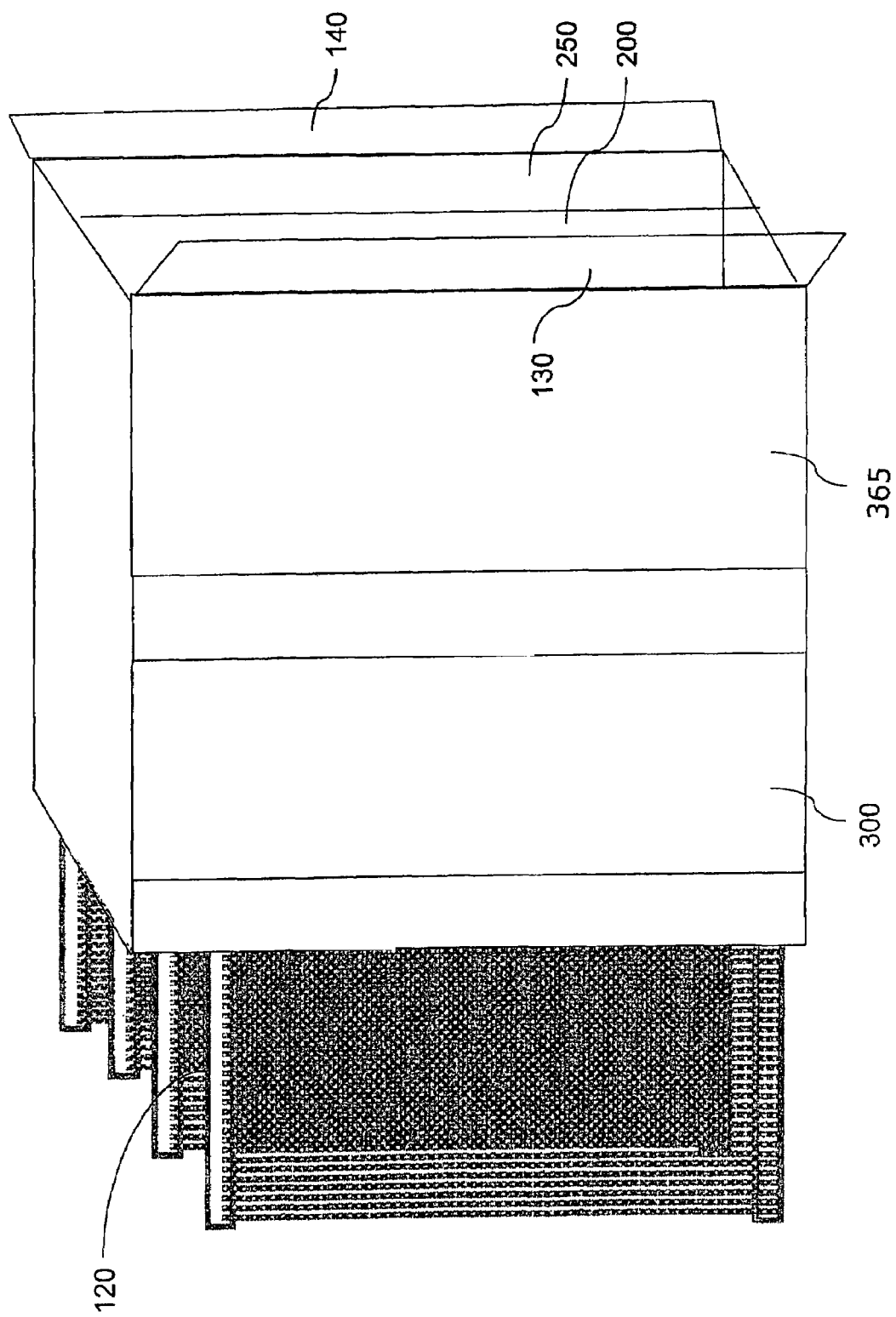

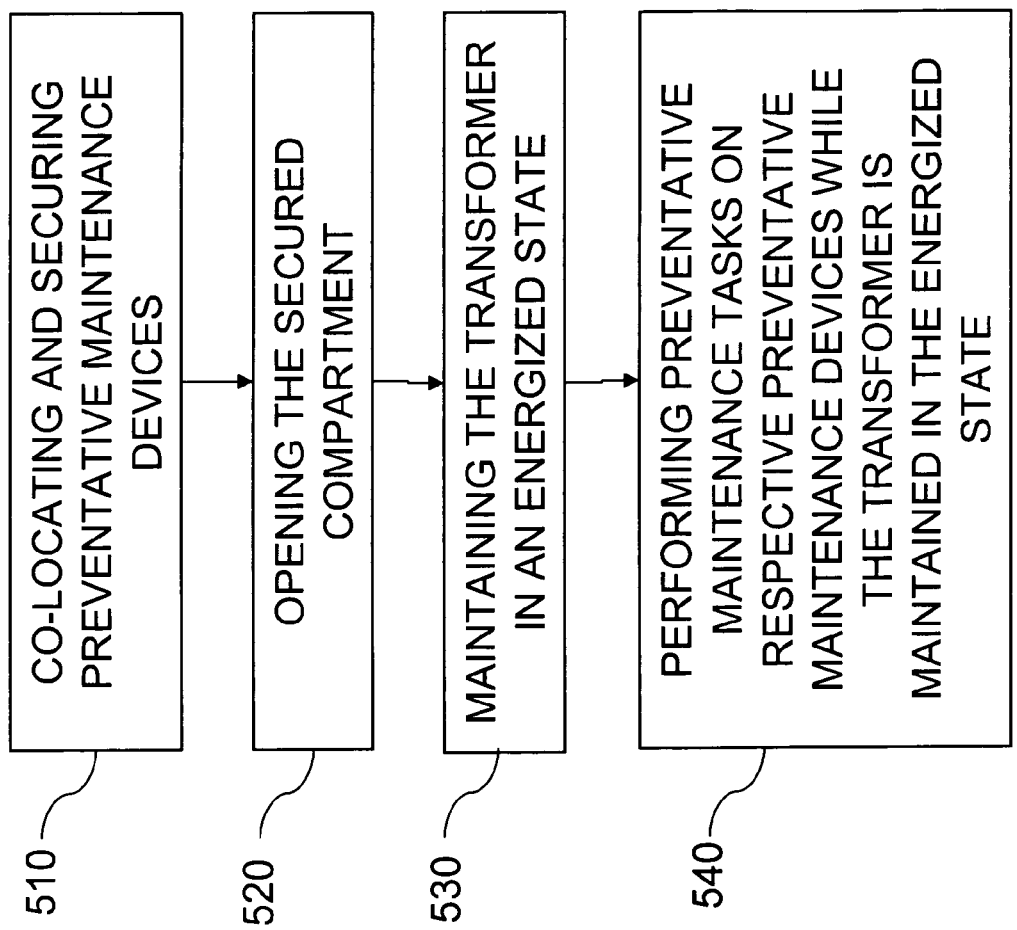

MULTI-COMPARTMENTAL TRANSFORMER AND METHODS OF MAINTENANCE THEREFOR

CROSS REFERENCE TO RELATED APPLICATION

This Non-Provisional Application is a Continuation-In-Part of Provisional Application No. 60/707,593 entitled "Multi-Compartmental Transformer," filed on Aug. 12, 2005, and claims the benefit thereof. The contents of this Provisional Application are herein incorporated by reference.

FIELD OF THE INVENTION

The present invention relates generally to transformers and methods of maintenance therefor and, in particular, to a compartmental transformer and a method of maintaining the compartmental transformer while the compartmental transformer is energized.

BACKGROUND OF THE INVENTION

To increase the life of utility assets such as compartmental transformers, periodic and preventative maintenance may be performed. The assessment of the condition and the maintenance of such transformers conventionally occurred by opening either or both of a High Voltage (HV) compartment (i.e., corresponding to a voltage of the primary winding of the compartmental transformer) or a Low Voltage (LV) compartment (i.e., corresponding to a voltage of the secondary winding of the compartmental transformer). In these compartmental transformers, the gauges and other equipment for periodic and preventative maintenance are inside the HV and/or LV compartments.

A problem can arise when equipment inside the LV compartment is energized to voltages that are unsafe without safety equipment or, otherwise, above 480 V ac. At these voltages, in particular, either personnel are required to have safety equipment, such as high voltage rubber gloves, protective clothing, rubber blankets, hot sticks or other barriers, among others, to reduce or prevent injury from accidentally contacting energized portions of the compartmental transformer or the compartmental transformer is de-energized (which reduces the availability of the transformer thereby potentially increasing overall costs) before maintenance operations occur. Moreover, because such gauges and other equipment for periodic and preventative maintenance are located inside the HV or LV compartments, maintenance personnel, even if safety equipment (e.g., HV gloves, hot sticks, rubber blankets or other safety devices, among others) is donned, come into close contact with equipment that is sometimes prone to catastrophic failure. In such cases, the maintenance personnel may be injured due to their proximity to the HV and/or LV compartments.

SUMMARY OF THE INVENTION

The present invention is embodied in a compartmental transformer having an HV side and an LV side, and including a first compartment housing first equipment electrically coupled to the HV side of the compartmental transformer and a second compartment housing second equipment electrically coupled with the LV side of the compartmental transformer. The compartmental transformer includes one or more maintenance compartments, separate from the first and second compartments, for housing a plurality of maintenance devices used for servicing the compartmental transformer while the compartmental transformer is energized.

The present invention is further embodied in a method of maintenance for an energized and grid connected compartmental transformer. The method includes collocating and securing preventative maintenance devices of the transformer in one or more secured compartments remote from a voltage at or above a level corresponding to the lower of the voltages of the primary or secondary sides of the transformer, maintaining the transformer in an energized state, opening at least one of the secured compartments, and performing preventative maintenance tasks on respective preventative maintenance devices while the transformer is maintained in the energized state.

BRIEF DESCRIPTION OF THE DRAWINGS

The invention is best understood from the following detailed description when read in connection with the accompanying drawings. It is emphasized that, according to common practice, various features/elements of the drawings may not be drawn to scale. On the contrary, the dimensions of the various features/elements may be arbitrarily expanded or reduced for clarity. Moreover in the drawings, common numerical references are used to represent like features/elements. Included in the drawing are the following figures:

FIG. 3B is a schematic diagram of a compartmental transformer showing an auxiliary compartment;

FIG. 5 is a flow chart illustrating a method of maintenance according to another embodiment of the present invention.

DETAILED DESCRIPTION OF THE INVENTION

Figure 1:
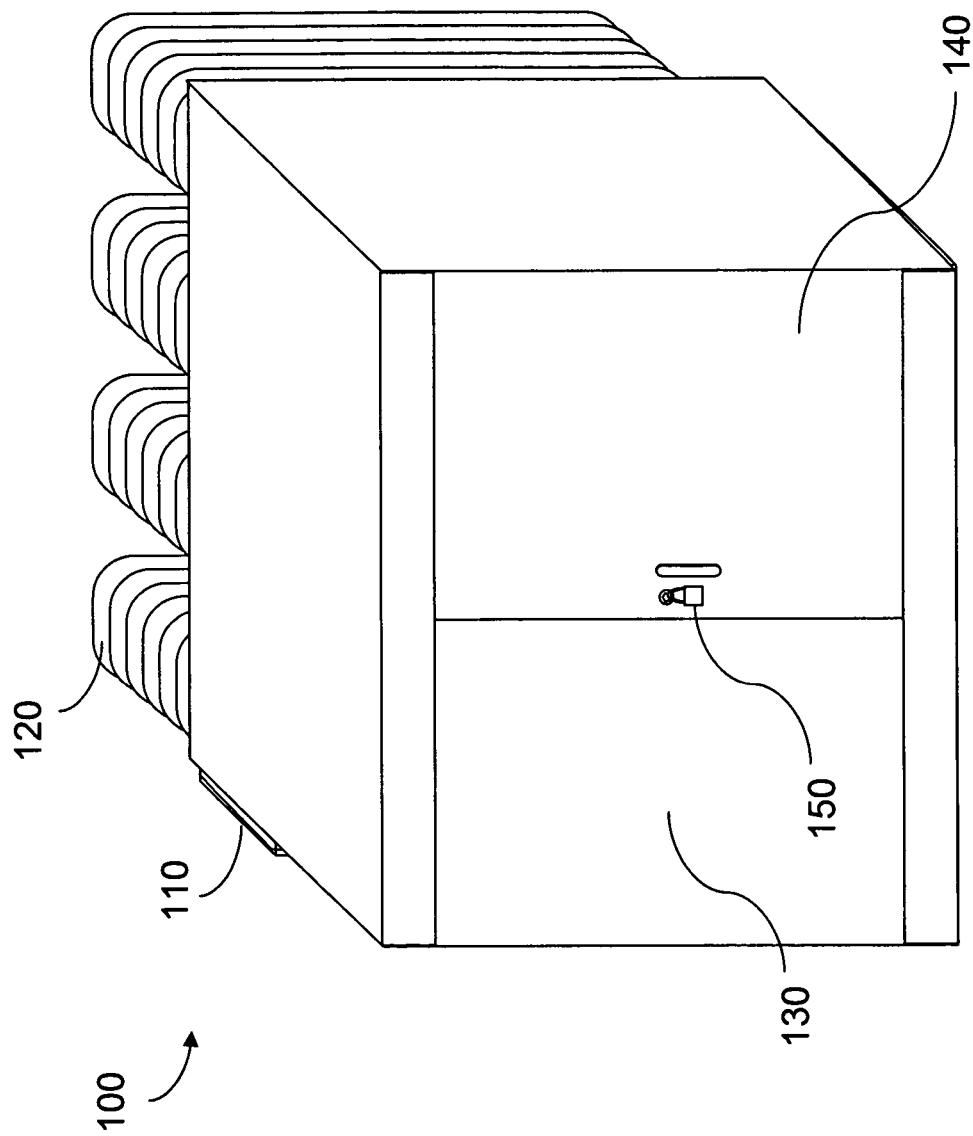
FIG. 1 is a schematic diagram of a compartmental transformer according to an embodiment of the present invention.

Although the invention is illustrated and described herein with reference to specific embodiments, the invention is not intended to be limited to the details shown. Rather, various modifications may be made in the details within the scope and range of equivalents of the claims and without departing from the invention.

An exemplary embodiment of the invention relates to electric transformers used to increase or decrease electric voltage or current.

A compartmental transformer refers to a transformer that houses live electrical parts inside compartments that are usually locked or, otherwise, tamper resistant. These transformers may not have external parts such as fans, control wiring, or switches exposed to the public, and they are, therefore, generally considered safe for pedestrians. Three phase compartmental transformers conventionally have only two compartments or "doors," one housing the HV equipment and one housing the LV equipment. The compartmental transformer may be rated between about 750 kVA and about 40 MVA. Other ratings which are out of this range, however, are possible.

Although in one exemplary embodiment a liquid immersed distribution and power class compartmental transformer is illustrated, it is contemplated that such a transformer may be any number of different transformers so long as a maintenance compartment is provided remote from any HV equipment, and may have the greatest benefit where the lowest voltage in the LV compartment exceeds 480 V ac. When maintenance personnel are maintaining equipment with voltages exceeding 480 V ac (i.e., they are in the vicinity of such voltages) such as in the case of conventional compartmental transformers, special precautions are taken to maintain safe working clearances while operating and/or servicing the equipment. By providing a remote maintenance compartment for preventative maintenance devices that is remote from the HV equipment, secure operation, service and routine maintenance of the compartmental transformer are made safer, easier, faster, and therefore less expensive. In addition, the compartmental transformer may be serviced while the transformer is energized.

An exemplary transformer used to develop embodiments of the present invention is a 9375 kVA, Pad-Mounted, Compartmental-Type, Self-Cooled, Three Phase, Liquid Filled Transformer with High-Voltage of 34400 V and Low-Voltage of 13200Y/7620 V. This substation class, "distribution center" transformer connected a 34 kV sub-transmission line to a 12.5 kV distribution feeder. The transformer incorporates a 3-phase solid dielectric vacuum recloser inside the LV compartment to act as a feeder breaker and a SCADA monitoring point. This information is provided by way of background and illustration only, and the invention is not restricted to such a transformer. Instead, it is contemplated that numerous other transformers may be used, for example: (1) transformer of other sizes; (2) non-pad-mounted transformers; (3) actively cooled transformers (e.g., with fans and/or circulation pumps); (4) transformers with different primary and/or secondary voltages; (5) transformers with different combinations of configurations (e.g., WYE-DELTA, DELTA-DELTA, DELTA-WYE, WYE-WYE, zig-zag and other configurations); and (6) transformers with any number of associated phases, among many others.

In conventional three-phase compartmental transformers, most of the gauges, valves, and other maintenance devices are located on a back wall (i.e., tank wall) of the HV and/or LV compartments. These gauges (indicators), valves, and other preventative maintenance devices may include, for example, (1) a coolant level gauge; (2) a coolant temperature gauge with or without a resettable drag hand; (3) a drain valve with a sampling port; (4) an On/Off switch for three-phase livening (this can prevent ferroresonance conditions); (5) a pressure/vacuum gauge with bleeder valve disposed in the tank space above the liquid coolant (e.g., a dielectric coolant such as oil); (6) gas space valves for cross tank purging and vacuum filling; (7) an equipment nameplate; and (8) control wiring for alarm contacts on the various gauges. Alternatively, instead of the resettable drag hand, a separate peak temperature gauge may to used to detect the peak temperature during a specified time period.

Locating these devices in the LV compartment of a conventional transformer with secondary voltages exceeding 480 V ac creates operational difficulties. That is, when the voltage inside the LV compartment exceed 480 V ac, the required working clearances create additional complexities for routine maintenance and operation.

An exemplary embodiment of the present invention uses at least one auxiliary compartment to house various gauges, valves, switches and other maintenance devices. By relocating these items in a separate compartment, routine maintenance may be performed in a safer, more efficient manner, while maintaining the transformer in an energized state during the maintenance.

Figure 3A:
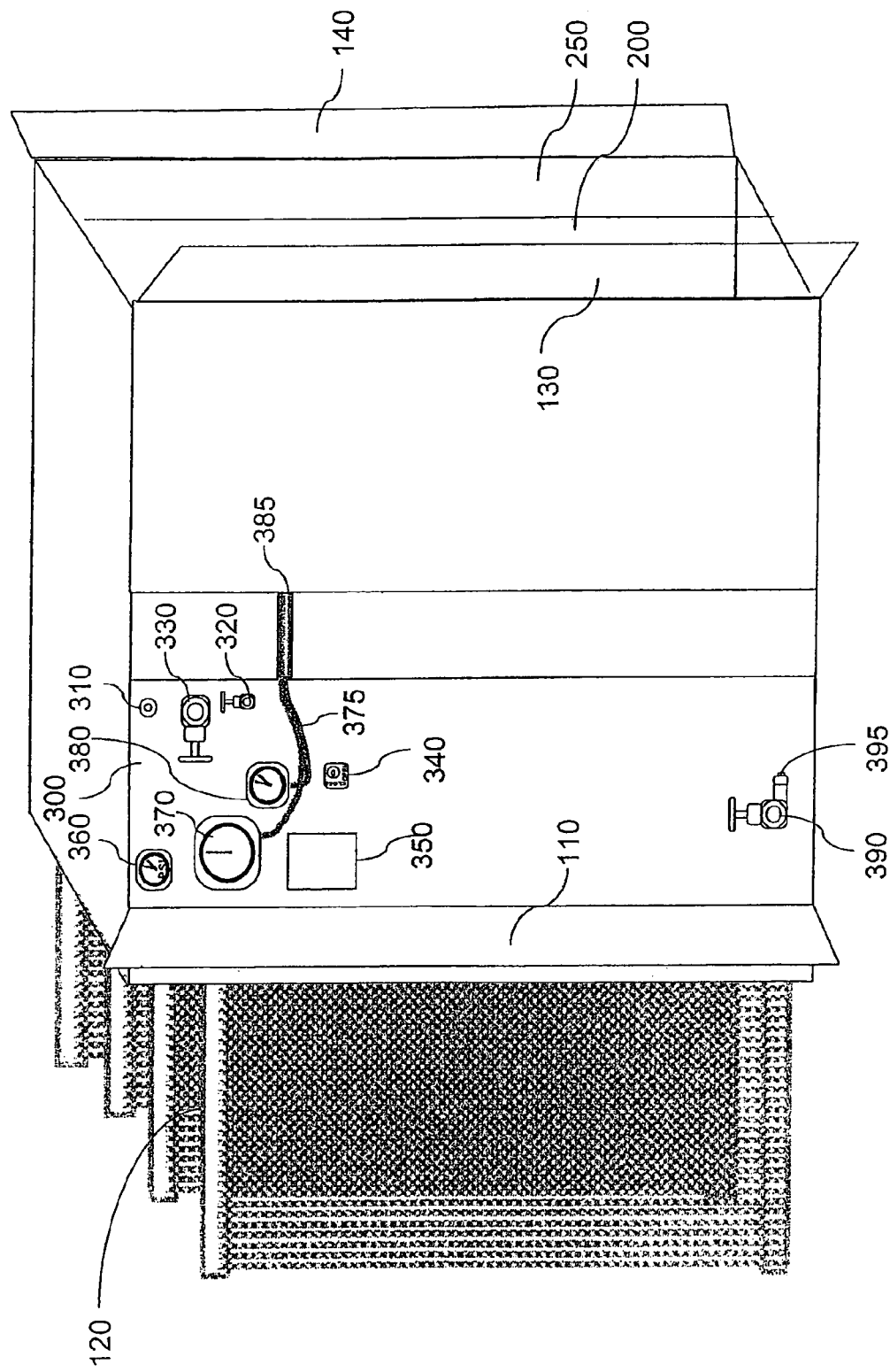
FIG. 3A is a schematic diagram of the compartmental transformer of FIG. 1 showing a maintenance compartment.

Although only a single auxiliary compartment or maintenance compartment is shown in FIG. 3A, more than one compartment may be provided (see FIG. 3B) and may include the use of multiple auxiliary compartments 300 and 365 housing different arrays of gauges, valves, and switches, among others such that, for example, various maintenance personnel may have access to a portion of these compartments according to their abilities or the maintenance tasks to be preformed. This increases safety of the personnel and security and reliability of the compartmental transformer.

Additional features of the present invention include but are not limited to: (1) removing workers from exposure to high voltage equipment (equipment energized to voltages above 50 V) since the HV and LV compartment doors may remain closed during most maintenance tasks; (2) periodic readings of the coolant temperature gauge, the coolant level gauge, and the pressure/vacuum gauge and resetting of the temperature gauge drag hands, may be performed while the transformer is energized and without exposure to energized equipment; and (3) routine liquid coolant sampling, for example oil sampling, also may be performed to analyze dissolved gas using dissolved gas analysis (DGA) on the liquid coolant while the transformer is energized and without exposure to energized equipment.

In a conventional compartmental transformer the drain valve is located at the bottom of the LV compartment and the conventional compartmental transformer is likely to be taken out of service to take samples and/or to drain the liquid coolant. Moreover, conventional compartmental transformers that are placed in-service or out-of-service using a three-phase switch, traditionally use a hook-stick operated switch (certified to withstand high voltage, for example, in the range of about 3 kV to about 50 kV). These switches in the conventional compartmental transformer are generally located in the HV compartment. Having exposed HV equipment in front of an operator creates an opportunity for a flash or other catastrophic failure. According to embodiments of the invention, maintenance personnel may open or may close such a switch from a separate compartment remote (away) from the HV equipment.

DGA test results sometimes dictate that purging of the tank space above the liquid coolant (e.g., oil) be performed to remove combustible or explosive (i.e., volatile) gases. Purging may be performed by blowing a dry gas, for example dry nitrogen, from one portion of the tank (e.g., one corner of the tank) and venting gas at another portion of the tank (e.g., an opposite corner). A conventional compartmental transformer is taken out of service for such maintenance activity since the purging valves are in the HV and LV compartments.

Many gauges are produced with dry contacts that may be used to trigger alarms in remote monitoring equipment. These dry contacts typically operate in a range of about 12 VDC to about 28 VDC whetting voltage (e.g., a control voltage) which is less than the voltage in the HV and LV compartments. Installing the gauges and wiring in one or more separate compartments allows for repair and replacement of the gauges and/or wiring, as well as simulation of alarm conditions without taking the transformer out-of-service. The highest voltage available in the separate compartments may be the whetting voltage (e.g., the control voltage).

A duplicate of the transformer's nameplate may be placed in one or more of the separate and remote compartments for ease of viewing without having to place the viewer in the vicinity of the HV equipment.

To maintain the enclosure integrity of a compartmental transformer, each of the auxiliary compartments and other compartments in an exemplary embodiment of the present invention meets the standard of a pry-bar and probe wire tests defined in ANSI (American National Standard Institute) C57.12.28. The door to each compartment of the compartmental transformer latch is secured with a penta-head bolt and a padlock.

Figure 2:
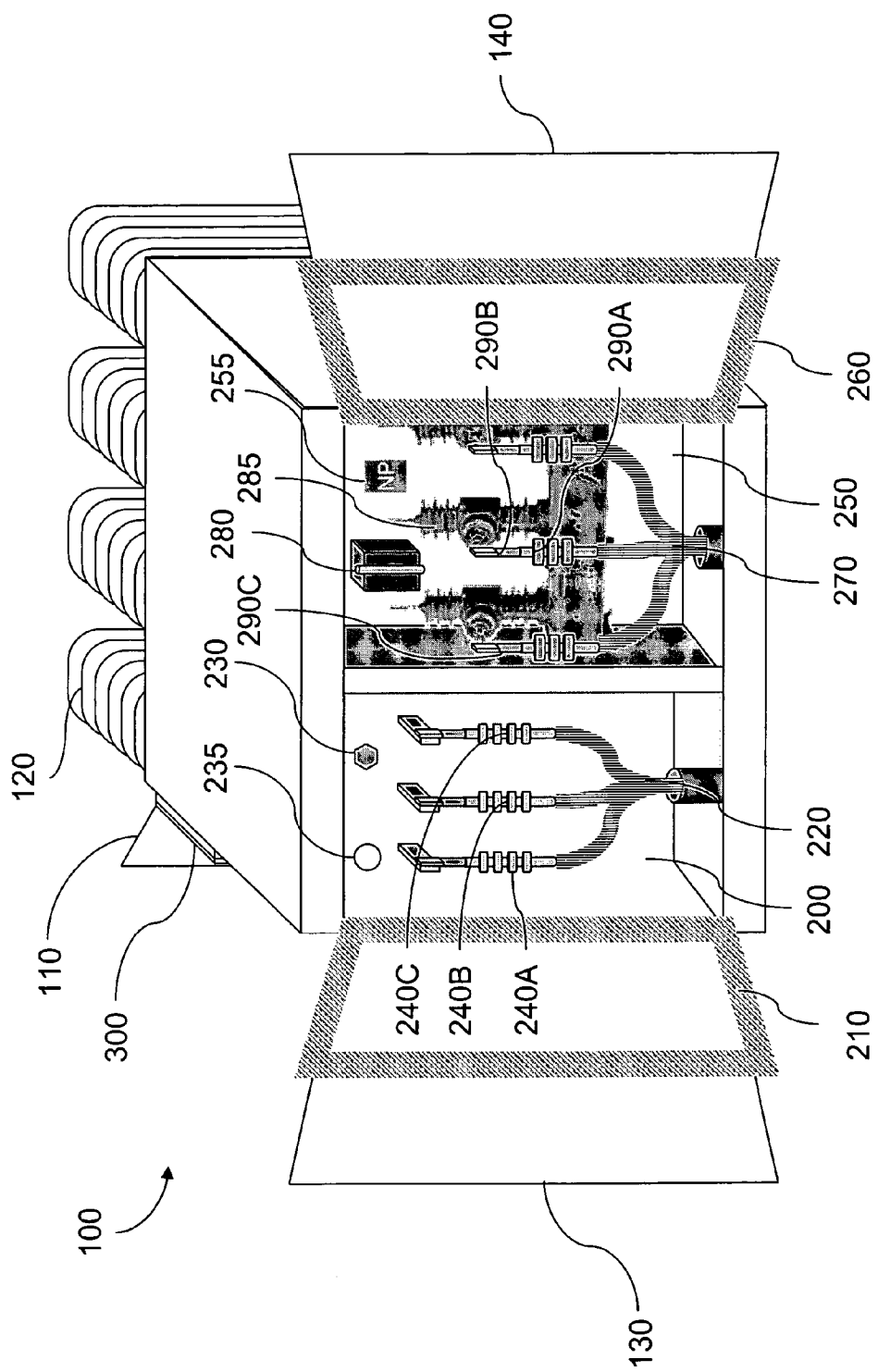
FIG. 2 is a schematic diagram of the compartmental transformer of FIG. 1 with the HV and LV compartments opened.

FIGS. 1-3 are schematic diagrams of the compartmental transformer according to an exemplary embodiment of the present invention. In particular, FIG. 1 illustrates when all compartments of the compartmental transformer are closed and secured; FIG. 2 shows the compartmental transformer when the HV and LV compartments are opened; and FIG. 3 shows the compartmental transformer when the maintenance compartment is opened.

Referring to FIGS. 1-3, there is shown a compartmental transformer 100 in accordance with the present invention. Compartmental transformer 100 includes an HV compartment 200, an LV compartment 250 and a maintenance compartment 300. Compartmental transformer 100 includes standard metal construction and at least the three separate compartments 200, 250 and 300.

HV compartment 200 includes an HV compartment door 130 used to close and secure HV compartment 200. LV compartment 250 includes an LV compartment door 140 used to close and secure LV compartment 250. HV and LV compartments 200 and 250 and corresponding HV and LV compartment doors 130 and 140 may be adjacent to one another.

Maintenance compartment 300 includes a maintenance compartment door 110 used to close and secure maintenance compartment 300. Maintenance compartment 300 may desirably be located remote from HV compartment 200 and LV compartment 250 to prevent any safety concerns related to maintenance personnel being physically close to HV compartment 200 and/or LV compartment 250. Each door 110, 130 and 140 includes a door latching mechanism which may be constructed to meet enclosure integrity standards defined in ANSI standard C57.12.28. Each of the compartment doors 110, 130 and 140 may be locked (i.e., secured) by a locking mechanism 150, for example, a padlock with a captive penta-head bolt.

Maintenance compartment 300 with its corresponding door 110 may be located on any side of compartmental transformer 100, including the same side as the HV and LV compartment 100. It may be desirable, however, to have maintenance compartment 300 spaced apart from HV and LV compartments 200 and 250 to reduce or substantially eliminate the chance that maintenance personnel may inadvertently be injured due to HV and LV compartments 200 and 250. That is, by placing the maintenance compartment 300 on a different side of compartmental transformer 100, compartmental transformer 100 blocks direct harm by HV and LV compartment devices (e.g., if components in the HV and/or LV compartments 200 and 250 flash over or catastrophically fail).

Figure 4:
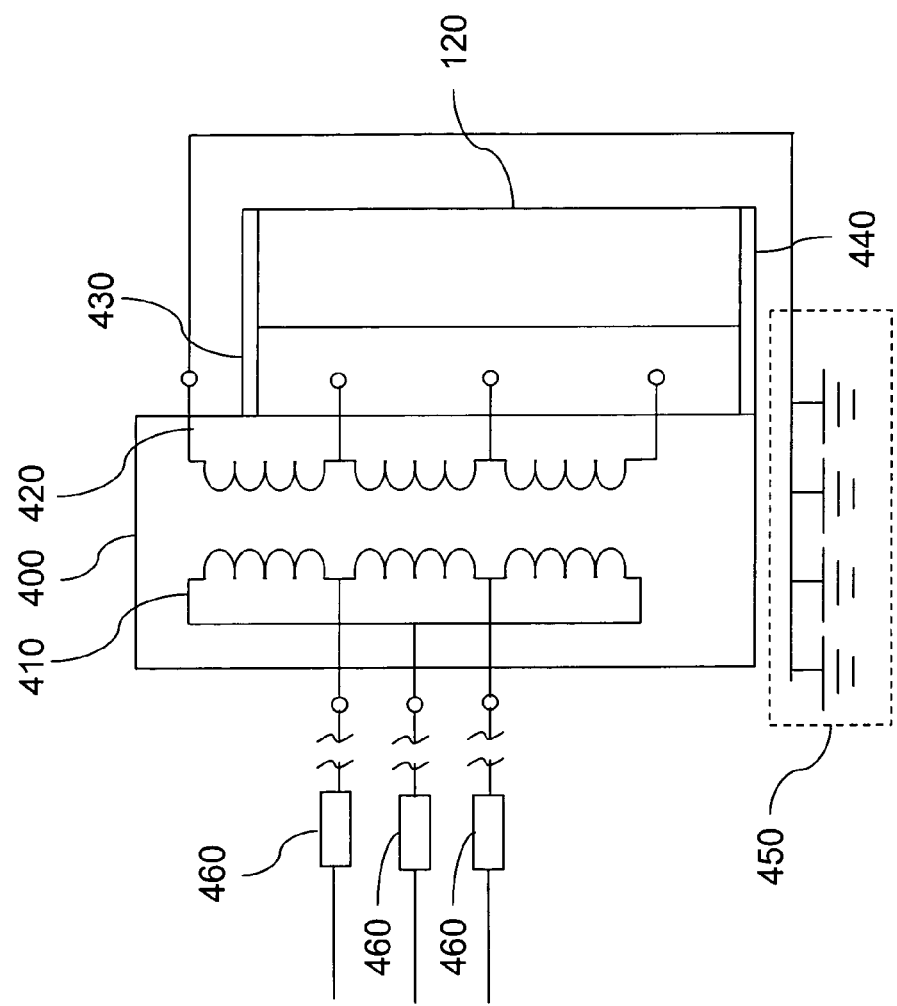
FIG. 4 is a schematic diagram of the compartmental transformer of FIG. 1 showing certain electrical and coolant systems.

As illustrated in FIG. 2, HV compartment 200 includes a terminal end of a distribution cable 220. Distribution cable 220 includes 3-phases, i.e., a first phase 240A, a second phase 240B and a third phase 240C. In this embodiment, as best shown in FIG. 4, phases 240A-240C are coupled to compartmental transformer 100 in a delta configuration. Moreover, HV compartment 200 includes a de-energized tap switch 230 to adjust the ratio of the primary winding to the secondary winding while the compartmental transformer is de-energized. De-energized tap switch 230 may be disposed in the HV compartment 200 to reduce or substantially eliminate attempts to change taps without de-energizing compartmental transformer 100. Also, large pressure relief valve 235 may be retained in HV compartment 200.

Although it is not shown, it is contemplated that de-energized tap switch 230 and/or large pressure relief valve 235 may be moved to one or more separate auxiliary compartments 300.

Although it is shown in FIG. 4 that the HV winding side 410 (the primary winding) in tank 400 of compartmental transformer 100 is in a delta configuration, other configurations are possible. These include a three phase WYE configuration or a zig-zag configuration, among others. Alternatively, compartmental transformer 100 may be a different configuration based on a different number of phases, for example, a single phase transformer configuration.

Although compartmental transformer 100 is shown being coupled to underground distribution cable 220, which enters HV compartment 200 from the bottom of compartmental transformer 100, it is contemplated that the distribution cable may also be an overhead cable and may enter from the top or any side of compartmental transformer 100.

HV compartment 200 further includes an HV shielding unit 210. HV shielding unit 210 may desirably be made of a translucent and impact resistant material such as, for example, polycarbonate, or other impact resistant plastics, among other. HV shielding unit 210 may pivot into an open position in which access to HV compartment 200 is enabled or may pivot into a closed position in which access to HV compartment 200 is denied to increase safety of personnel providing maintenance on compartmental transformer 100. That is, HV shielding unit 210 allows maintenance personnel the ability to view HV compartment 200 without opening (i.e., pivoting) HV shielding unit 210 such that if any of the components inside HV compartment 200 are compromised (e.g., by a catastrophic failure), injury to personnel due to such a failure may be prevented by HV shielding unit 210.

LV compartment 250 includes an LV shielding unit 260, an end termination of LV distribution outgoing cable 270, an auxiliary power unit (e.g., a dry type metering potential transformer) 280 and a solid dielectric vacuum recloser 285. LV distribution outgoing cable 270 includes a first phase 290A, a second phase 290B and a third phase 290C. Phases 290A-290C may be coupled via recloser 285 to an LV winding side of compartmental transformer 100. An equipment nameplate 255 may be attached to LV tank wall, consistent with industry practices.

HV compartment 200 and LV compartment 250 are located behind and separated from doors 130 and 140, respectively, by HV and LV shielding units 210 and 260. The HV and LV shielding units 210 and 260 are of preferably sufficient clarity to allow one to see into respective compartments 200 and 250 before accessing the compartments 200 and 250, and meet the "second conscious act" required to gain access to HV equipment.

LV winding side 420 (secondary winding) in tank 400 of compartmental transformer 100, as best shown in FIG. 4, is in a WYE configuration, however, other configurations are possible. These include a DELTA configuration or a zig-zag configuration, among others. Alternatively, compartmental transformer 100 may have a different configuration based on a different number of phases, for example, a single phase transformer configuration.

Recloser 285 allows LV outgoing distribution cable 270 to be disconnected from the LV winding side 420 of compartmental transformer 100, and includes three separate recloser components to respectively disconnect/reclose each phase 290A-290C of the outgoing distribution cable 270 to respective phases of the LV winding of compartmental transformer 100.

As best shown in FIG. 3, maintenance compartment 300 includes maintenance compartment door 110, a gas purge valve 310, a coolant fill valve 320, a vacuum fill valve 330, an on/off switch 340, an additional nameplate 350, a pressure/vacuum gauge (with bleeder valve) 360, a coolant level gauge 370, a coolant temperature gauge 380, and a coolant drain valve 390 with sampling port 395.

Maintenance compartment 300 desirably may be disposed behind maintenance compartment door 110 which may be tamper resistant and may meet ANSI C57.12.28 standards. Since only voltages at or below a control voltage level (i.e., in the range of least than 50 VDC) are provided in maintenance compartment 300, a translucent shielding unit is not used in this exemplary embodiment. That is, no translucent barrier is provided because there is no HV equipment in this compartment 300. If desired, one could be added. In this exemplary embodiment, coolant drain valve 390 with sampling port 395 is provided at a bottom of maintenance compartment 300 to allow for proper draining of the liquid coolant.

Sampling port 395 may be used by maintenance personnel to take samples of liquid coolant (for example, a dielectric coolant, FR3, natural ester-based fluids or silicone fluid, oil, among others) while the transformer is energized to allow analysis of the contents of the sampled liquid coolant.

Based on the analysis of the liquid coolant, a maintenance schedule and/or one or more maintenance repairs for compartmental transformer 100 may be determined to be needed. That is, the contents of the sampled liquid coolant may be analyzed by performing a dissolved gas analysis (DGA) on the liquid coolant. Since compartmental transformer 100 is not de-energized during sampling, the DGA analysis is not skewed by arcing during de-energizing of compartmental transformer 100 which may otherwise occur. Thus, exemplary embodiments of the present invention may allow for improved DGA results. Moreover, the sampling of the liquid coolant may be performed without any electrical insulation devices, such as HV gloves, hot sticks, rubber blankets or other safety devices, among others. One maintenance repair that may result from analyzing the DGA may be the purging of the volatile gases from the head end of tank 400. Moreover, by checking respective indicator gauges, for example for peak coolant temperature, relative to a predetermined threshold a compartmental transformer overload condition may be indicated. If the compartmental transformer overload condition is indicated, a DGA may be performed to determine existing damage to compartmental transformer 100 and to determine maintenance scheduling and maintenance repairs.

Pressure/vacuum gauge (with bleeder valve) 360 may be used in conjunction with gas purge valve 310 for purging a space above the liquid coolant in tank 400 (see FIG. 4) with a dry gas, for example nitrogen. The bleeder valve and gas purge valve 310 each have internal piping (not shown) to opposing corners of tank 400 to allow cross-tank purging of a head space (i.e., the space above the liquid coolant). That is, by opening the bleeder valve and gas purge valve 310 and blowing, for example, nitrogen gas under pressure across the head space of tank 400, maintenance personnel may purge volatile gases from tank 400 of compartmental transformer 100. This method reduces the amount of volatile gases which are built up due to operation of compartmental transformer 100 and which may pose a safety concern when the volatile gases reach a predetermined concentration level in tank 400.

Maintenance compartment 300 may also include coolant level gauge 370. Coolant level gauge 370 may be used to measure coolant levels inside tank 400 Coolants may include, for example oil, FR3, ester-based fluids or other dielectrically insulating fluids, silicone fluid, among others. Control wiring 375 for various gauges and/or sensors may be run through tamper-resistant conduit 385 to a central processing unit (not shown) for alarms or Supervisory Control And Data Acquisition (SCADA). Vacuum fill valve 330 and coolant fill valve 320 may be used for vacuum filling tank 400. If the level of liquid coolant is below a predetermined threshold based on information from coolant level gauge 370, maintenance personnel may fill or refill the liquid coolant in tank 400.

Coolant level may be determined by coolant level gauge 370 disposed in maintenance cabinet 300. Coolant level gauge 370 may include a float projecting into tank 400 to measure the liquid coolant level in tank 400.

An additional equipment nameplate 350 is provided in maintenance compartment 300 to avoid entering LV compartment 250 when information from the nameplate may be required.

On/off switch 340 may be disposed in maintenance compartment 300 for switching on/off compartmental transformer 100. That is, on/off switch 340 connects/disconnects the HV or the LV winding from the incoming HV line or the outgoing distribution line, respectively. By providing on/off switch 340 in maintenance compartment 300, maintenance personnel do not have to enter HV compartment 200 or LV compartment 250, thereby increasing safety. This may be particularly desirable where LV compartment 250 includes a phase-to-ground voltage or a phase-to-phase voltage of more than a threshold amount, for example, at or above 480 V ac, for which safety equipment (e.g., HV gloves, hot sticks, rubber blankets or other safety devices, among others) may be required.

Coolant temperature gauge 380 also may be disposed in maintenance compartment 300, and may include both a real-time coolant temperature measurement device and a peak coolant temperature measurement device (e.g., a drag hand) which may be resettable by maintenance personnel. The peak coolant temperature measurement device may provide an indication of peak loading conditions of compartmental transformer 100 and may allow maintenance personnel to check whether compartmental transformer 100 is operating within predefined temperature parameters, or, otherwise, may allow these personnel to determine whether maintenance on compartmental transformer 100 may be necessary. For example, a peak temperature which is above a predetermined threshold may indicate an overload condition on compartmental transformer 100 caused by debris built up on radiators 120, or may indicate the needed to add or replace the liquid coolant or replace a real-time coolant temperature measurement device, among others.

Although it is shown that maintenance compartment 300 is a single compartment, it is contemplated that maintenance compartment 300 may be one or more compartments in which various preventative maintenance devices 310, 320, 330, 340, 350, 360, 370, 380 and 390 are disposed (i.e., co-located). In this way, particular maintenance personnel may be provided access only to particular compartments to increase safety of the personnel and security and reliability of the compartmental transformer 100. Maintenance compartment 300 may also be a cabinet attached to or, otherwise, connected to compartmental transformer 100.

Although it is shown that the maintenance compartment 300 spans the entire height of compartmental transformer 100, it is further contemplated that this compartment 300 may be of any height or may be multiple compartments. For example, since external tank bracing may prevent a common compartment door, drain valve 390 is preferably disposed at a bottom of compartmental transformer 100 and certain gauges and/or other valves 310, 320, 330, 340, 350, 360, 370, 380 are preferably located in the vicinity of the head space at the top of compartmental transformer 100, multi-compartments may be desirable.

By co-locating and securing preventative maintenance devices 310, 320, 330, 340, 350, 360, 370, 380 and 390 in one or more secured compartments remote from HV and LV compartments 200 and 250, it is possible to increase safety for maintenance personnel because entry into areas having voltages above the control voltage is prevented. Moreover, by co-locating these preventative maintenance devices 310, 320, 330, 340, 350, 360, 370, 380 and 390 to one or more secured locations remote from (i.e., away from) HV compartment 200 and LV compartment 250, it is possible to use maintenance personnel which have not been trained for high voltage accessible areas, and to use maintenance procedures which do not require either de-energizing compartmental transformer 100 or using HV maintenance techniques, such as those using (e.g., HV gloves, hot sticks, rubber blankets or other safety devices, among others) to perform various maintenance tasks, thereby also reducing costs.

It will be understood by those skilled in the art that coupling of gauges, switches and/or valves to, for example, tank 400 of compartmental transformer 100 is well known as illustrated by, for example, a 1997 publication by Cooper Power System entitled "TWO-POSITION SIDEWALL (HORIZONTAL) MOUNTED LOADBREAK SWITCHES INSTALLATION INSTRUCTIONS."

FIG. 4 is a schematic diagram illustrating certain electrical and coolant flow systems for compartmental transformer 100.

Referring to FIG. 4. compartmental transformer 100 includes liquid coolant tank 400 coupled to one or more radiators 120 via inlets 430 and outlets 440. That is, by natural convection, liquid coolant may circulate through the one or more radiators 120 to cool the liquid coolant by heat exchange with air surrounding the radiators 120. Moreover, compartmental transformer 100 may include a primary winding (i.e., HV winding) 410 and a secondary winding (i.e., LV winding) 420.

Compartmental transformer 100 is shown as a DELTA-WYE winding configuration. Numerous other winding configuration, however, are also possible. One leg of LV winding 420 may be coupled to a ground grid 450 in the vicinity, adjacent to and/or below compartmental transformer 100. By providing ground grid 450 coupled to LV winding 420 safety of individuals in the vicinity of compartmental transformer 100 is increased. Ground grid 450 may be sized based on certain factors to reduce or substantially eliminate the potential for injury or death (based on, for example, IEEE 80 standard) to personnel in the vicinity of compartmental transformer 100. The size of ground grid 450 sufficient to prevent injury is directly related to the time period for de-energizing compartmental transformer 100. By providing fast acting fuses (e.g., current limiting fuses, electronic power fuses or other fuse devices) or switching devices 460 in series with respective phases of incoming HV distribution line 220, the size of ground grid 450 may be reduced. Fast acting fuses or switching devices 460 may desirably be disposed remote from compartmental transformer 100 to eliminate common mode failures between fast acting fuses 460 and compartmental transformer 100. Moreover, fast acting fuses 460 may desirably de-energized compartmental transformer 100 faster than about 0.5 seconds.

FIG. 5 is a flow chart illustrating a method of maintenance according to another embodiment of the present invention.

Referring to FIG. 5, a method 500 of maintenance for an energized and grid connected compartmental transformer is shown. Method 500 includes the steps of: (1) co-locating and securing preventative maintenance devices in one or more secured compartments remote from a voltage at or above a level corresponding to the lower of the voltages of the primary or secondary sides of transformer 100 at block 510; (2) maintaining transformer 100 in an energized state at block 520; (3) opening at least one of the secured compartments 300 at block 530; and (4) performing preventative maintenance tasks on respective preventative maintenance devices while transformer 100 is maintained in the energized state at block 540.

Moreover, the step of co-locating preventative maintenance devices may include the step of collocating two or more of: (1) drain valve 390 or sampling port 395 coupled to tank 400 holding liquid coolant, and used for removing the liquid coolant from tank 400; (2) coolant level gauge 370 coupled to tank 400 and used for measuring a level of the liquid coolant in tank 400; (3) pressure level gauge 360 coupled to the head space of tank 400 to measure gas pressure in the head space of tank 400; (4) on/off switch 340 coupled to a primary winding side of transformer 100 to energize or de-energize transformer 100; (5) purging/filling valve 310 coupled to tank 400 for purging/filling of gases in the head space of tank 400; (6) liquid coolant filling valve 320 coupled to tank 400 to add liquid coolant to tank 400; and (7) a liquid coolant temperature gauge 380 to measure an actual temperature of the liquid coolant in tank 400 and a peak temperature of the liquid coolant during a specified time period which is resettable.

An example of a preventative maintenance task may include when pressure/vacuum gauge 360 indicates that a gas pressure level existing in tank 400, is below a predetermined level, pressure in tank 400 is increased by opening vacuum/filling valve 330 and adding gas under pressure to transformer 100 while transformer 100 is energized. Another example of a preventative maintenance task may include when a dissolved gas analysis indicates the content of the head space that is volatile, tank 400 is purged by opening vacuum/filling valve 330 and the bleeder valve located in secured compartment 300 to remove the volatile gas from tank 400 while transformer 100 is energized. A further example of such a task may include when liquid coolant level gauge 370 indicates a liquid coolant level is below a predetermined level, the coolant level is increased in tank 400 by opening liquid coolant filling valve 320 and adding liquid coolant to transformer 100 while transformer 100 is energized.

Although the invention is illustrated and described herein with reference to a specific embodiment, the invention is not intended to be limited to the details shown. Rather, various modifications may be made in the details within the scope and range of equivalents of the claims and without departing from the invention.

What is claimed:

1. A compartmental transformer including a first compartment housing first equipment and a second compartment housing second equipment, the first compartment having a first compartment door, which selectively closes, to cover a first compartment opening for enclosing the first compartment, the second compartment having a second compartment door, which selectively closes, to cover a second compartment opening for enclosing the second compartment, the compartmental transformer comprising:

a primary winding electrically coupled to the first equipment and generating a first voltage level;

a secondary winding electrically coupled to the second equipment for providing a second voltage level, different from the first voltage level;

a housing including first and second walls forming respectively different sides of the compartmental transformer and facing respectively different directions; and a maintenance compartment to house a plurality of maintenance devices for monitoring and/or servicing the compartmental transformer, the maintenance compartment being located on the first wall of the compartmental transformer and having a maintenance compartment door, which selectively closes, to cover a maintenance compartment opening for separately enclosing the maintenance compartment from the first and second compartments, the first and second compartments being located on the second wall of the compartmental transformer, the maintenance compartment opening facing a different direction than either the first or second compartment openings, wherein the maintenance compartment is physically separated from the first and second compartments, and at least one of the plurality of maintenance devices is monitored and/or serviced at a time the primary and secondary windings of the compartmental transformer are energized.

2. The compartmental transformer according to claim 1, wherein the secondary winding of the compartmental transformer is at a voltage at or above 480 V AC.

3. The compartmental transformer according to claim 1, wherein each voltage supplied to a respective one or respective ones of the plurality of maintenance devices within the maintenance compartment is at or below a control voltage level.

4. The compartmental transformer according to claim 3, wherein all voltages inside the maintenance compartment are limited to voltages at or below the control voltage level.

5. The compartmental transformer according to claim 4, wherein the control voltage level is at or below 480 V AC.

6. The compartmental transformer according to claim 4, wherein the second equipment inside the second compartment is supplied with a voltage that is greater than the control voltage level.

7. The compartmental transformer according to claim 4, wherein the compartmental transformer has a power rating based on natural convection between 750 kVA and 40 MVA.

8. The compartmental transformer according to claim 4, wherein the compartmental transformer is a three phase transformer that supplies three phase distribution voltage levels.

9. The compartmental transformer according to claim 4, further comprising:

a tank partially filled with liquid coolant and having a head space and wherein the maintenance devices includes at least one of: (1) a switch coupled to one or both of the primary winding and/or the secondary winding of the compartmental transformer to energize or de-energize the compartmental transformer; (2) a drain valve and/or a sampling port coupled to the tank to drain/sample the liquid coolant from the tank of the compartmental transformer; (3) a gas purge valve coupled to the head space of the tank for purging a gas therefrom; (4) a pressure gauge coupled to the head space of the tank for measuring gas pressure inside the tank; and (5) a thermometer coupled to the tank to measure liquid coolant temperature.

10. The compartmental transformer according to claim 1, wherein the first compartment door, the second compartment door and the maintenance compartment door each are tamper resistant.

11. The compartmental transformer according to claim 1, further comprising:

a ground grid to sufficiently ground the compartmental transformer coupled thereto to prevent injury during a transformer fault;

an incoming distribution line supplying power to the compartmental transformer; and a fusing unit disposed in series with and remote from the compartmental transformer to disconnect the compartmental transformer in sufficient time from the incoming distribution line to enable reduction in the ground grid while maintaining a sufficient ground by the ground grid to prevent injury during the transformer fault.

12. The compartmental transformer according to claim 1, further comprising:

a separate auxiliary compartment different than the first, second or maintenance compartments; and at least one of: a tap changer or a pressure relief valve located in the auxiliary compartment for maintenance of the compartmental transformer responsive to the primary and secondary windings being de-energized.

13. The compartmental transformer according to claim 1, wherein at least one of the plurality of maintenance devices is used to service the compartmental transformer while the first equipment electrically coupled to the primary winding of the compartmental transformer and the second equipment electrically coupled to the secondary winding of the compartmental transformer are energized.

14. The compartmental transformer according to claim 1, wherein one of the first and second compartments includes a translucent barrier therein that is moveable between: (1) an open position to access respective first or second equipment; and (2) a closed position to denied access to the respective first or second equipment while simultaneously providing a view of the respective first or second equipment.

15. The compartmental transformer according to claim 1, further comprising:

at least one intermediate wall between the maintenance compartment and the first compartment and between the maintenance compartment and the second compartment to isolate the maintenance compartment from both the first and second compartments.

16. The compartmental transformer according to claim 15, further comprising:

a tank including a plurality of tank walls for storing coolant to cool the compartmental transformer, wherein the at least one intermediate wall includes one or more of the tank walls.

17. A method of maintenance for a grid connected compartmental transformer having a primary winding electrically coupled to first equipment disposed in a first compartment and a secondary winding electrically coupled to second equipment disposed in a second compartment, comprising the steps of:

a) co-locating and securing preventative maintenance devices of the compartmental transformer in one or more secured maintenance compartments remote from the first or second compartments, the one or more maintenance compartments being physically separated from the first and second compartments by one or more walls;

b) locating at least one of the secured maintenance compartments on a different side of the compartmental transformer and facing a respectively different direction than either the first compartment or the second compartment to shield maintenance personnel from primary and secondary side voltages generated by the primary and secondary windings;

c) opening the at least one of the secured maintenance compartments;

d) simultaneously maintaining the compartmental transformer in an energized state, and performing preventative maintenance tasks on one or more preventative maintenance devices in the maintenance compartment.

18. The method according to claim 17, wherein one of the preventative maintenance devices includes a sampling port, and the performing preventative maintenance tasks comprises the steps of:
sampling liquid coolant of the compartmental transformer from the sampling port while the primary and secondary windings are energized;
analyzing contents of the sampled liquid coolant; and
determining based on the analyzed contents of the sampled liquid coolant, a maintenance schedule and/or one or more maintenance repairs for the compartmental transformer.

19. The method according to claim 18, wherein the analyzing of the contents of the sampled liquid coolant includes the step of:
performing a dissolved gas analysis on the sampled liquid coolant.

20. The method according to claim 17, wherein the performing of the preventative maintenance tasks occurs using no electrical insulation devices.

21. The method according to claim 17, wherein step (a) of co-locating preventative maintenance devices includes co-locating two or more of: (1) a drain valve or a sampling port coupled to a tank holding liquid coolant, and used for removing the liquid coolant from the tank; (2) a liquid level gauge coupled to the tank and used for measuring a level of the liquid coolant in the tank; (3) a pressure level gauge having a bleeder valve, the pressure level gauge being coupled to a head space of the tank to measure a gas pressure in the head space of the tank; (4) a switch coupled to the primary winding or the secondary winding of the compartmental transformer to energize or de-energize the compartmental transformer; (5) a purging/filling valve coupled to the tank for purging/filling of gas in the head space of the tank; (6) a liquid coolant filling valve coupled to the tank to add liquid coolant to the tank; and (7) a liquid coolant temperature gauge to measure an actual temperature of the liquid coolant in the tank and a peak temperature of the liquid coolant during a specified time period.

22. The method according to claim 21, wherein the performing of the preventative maintenance tasks comprises:
when the pressure level gauge indicates that a gas pressure level existing in the tank is below a predetermined level, increasing pressure in the tank by opening the purging/filling valve and adding gas under pressure to the compartmental transformer while the primary and secondary windings are energized.

23. The method according to claim 21, wherein the performing of the preventative maintenance tasks comprises:
when a dissolved gas analysis indicates a content of existing gas is volatile, purging the tank by opening the purging/filling valve and the bleeder valve located in the at least one of the secured maintenance compartments to remove the volatile gas from the tank while the primary and secondary windings are energized.

24. The method according to claim 17, wherein the preventative maintenance devices include a liquid coolant level gauge and a liquid coolant filling valve for use in adding liquid coolant to a tank used for holding the liquid coolant of the compartmental transformer, and the performing of the preventative maintenance tasks comprises:
when the liquid coolant level gauge indicates a liquid coolant level is below a predetermined level, increasing the liquid coolant level in the tank by opening the liquid coolant filling valve and adding the liquid coolant to the compartmental transformer while the primary and secondary windings are energized.

25. The method according to claim 17, wherein the preventative maintenance devices in the maintenance compartment include indicators, the method further comprising:
comparing a respective one or respective ones of the indicators relative to one or more predetermined thresholds; and
if the comparison indicates a transformer overload condition, performing a dissolved gas analysis to determine existing damage to the compartmental transformer.

* * * * *

UNITED STATES PATENT AND TRADEMARK OFFICE
CERTIFICATE OF CORRECTION

PATENT NO. : 7,636,233 B2
APPLICATION NO. : 11/238799
DATED : December 22, 2009
INVENTOR(S) : Thomas P. Callsen and Martin A. Rave It is certified that error appears in the above-identified patent and that said Letters Patent is hereby corrected as shown below:

Column 11, line 47 "includes" should be --include--.

Signed and Sealed this

Twentieth Day of April, 2010

David J. Kappos
*Director of the United States Patent and Trademark Office*